(12) United States Patent
Shamir et al.

(10) Patent No.: US 10,900,863 B2
(45) Date of Patent: Jan. 26, 2021

(54) IDENTIFICATION OF AIR LEAKS IN A COMPRESSED AIR SYSTEM USING A PLURALITY OF CURRENT MEASUREMENT SENSORS

(71) Applicant: Panoramic Power Ltd., Kfar-Saba (IL)

(72) Inventors: Adi Shamir, Kidron (IL); Yehoshua Rosenberg, Nokdim (IL); Reuven Avraham Marko, Netanya (IL)

(73) Assignee: Panoramic Power Ltd., Kfar-Saba (IL)

( * ) Notice: Subject to any disclaimer, the term of this patent is extended or adjusted under 35 U.S.C. 154(b) by 287 days.

(21) Appl. No.: 16/100,810

(22) Filed: Aug. 10, 2018

(65) Prior Publication Data

US 2019/0049332 A1    Feb. 14, 2019

Related U.S. Application Data

(60) Provisional application No. 62/543,394, filed on Aug. 10, 2017.

(51) Int. Cl.
*G01M 3/32* (2006.01)
*G06K 9/62* (2006.01)
(Continued)

(52) U.S. Cl.
CPC ........ *G01M 3/3272* (2013.01); *G01M 3/2815* (2013.01); *G06F 17/18* (2013.01); *G06K 9/00979* (2013.01); *G06K 9/6219* (2013.01); *G06K 9/6226* (2013.01); *G06K 9/00536* (2013.01)

(58) Field of Classification Search
USPC ........................................................ 702/47
See application file for complete search history.

(56) References Cited

U.S. PATENT DOCUMENTS

| 3,955,136 A | 5/1976 | Wiltshire et al. |
| 4,571,986 A | 2/1986 | Fujii et al. |

(Continued)

FOREIGN PATENT DOCUMENTS

| CN | 102563362 B | 8/2013 |
| JP | 5274618 B2 | 8/2013 |

OTHER PUBLICATIONS

Abdelaziz, et al., "A Review on Energy Saving Strategies in Industrial Sector", Renewable and Sustainable Energy Reviews 15, Malaysia, 2011, pp. 150-168.

(Continued)

*Primary Examiner* — Paul D Lee
(74) *Attorney, Agent, or Firm* — M&B IP Analysts, LLC

(57) ABSTRACT

An apparatus and method for identification of air leaks in a compressed air system are presented. The method includes receiving system data including current samples of air compressors of the compressed air system from at least one self-powered power sensor; aggregating the system data; dividing the aggregated system data into a plurality of clusters; merging overlapping clusters to reduce the number of clusters to two clusters, wherein a first cluster represents a baseload current and a second cluster represents a full-load current; determining the baseload current to full-load current ratio and comparing the ratio to a predetermined standard; and determining if an air leak is present if the ratio is below the predetermined standard.

21 Claims, 13 Drawing Sheets

(51) Int. Cl.
*G06K 9/00* (2006.01)
*G01M 3/28* (2006.01)
*G06F 17/18* (2006.01)

(56) References Cited

U.S. PATENT DOCUMENTS

| | | | |
|---|---|---|---|
| 4,890,459 | A | 1/1990 | Havemann |
| 6,684,869 | B2 | 2/2004 | Ponagai et al. |
| 7,739,899 | B1 | 6/2010 | Holland et al. |
| 9,719,880 | B2 | 8/2017 | Konrath et al. |
| 2004/0088069 | A1 | 5/2004 | Singh |
| 2010/0082293 | A1* | 4/2010 | Mitchell ............ G05B 19/0428 702/182 |
| 2012/0290230 | A1 | 11/2012 | Gonzalez et al. |
| 2014/0142905 | A1 | 5/2014 | Drees et al. |
| 2014/0297208 | A1* | 10/2014 | Arensmeier ....... G05B 23/0221 702/58 |
| 2015/0338314 | A1 | 11/2015 | Meyer |
| 2015/0343120 | A1 | 12/2015 | Yokoi et al. |

OTHER PUBLICATIONS

Benton, et al., "Compressed Air Evaluation Protocol", Subcontract Report: NREL/SR-7A40-68577 for the National Renewable Energy Laboratory (NREL), Golden, CO., Oct. 2017.
Bishop, "Pattern Recognition and Machine Learning", 2006, Springer, NY.
Marshall, "Finding and Fixing Leaks", Compressed Air Challenge—Air Best Practices.com, 2013, url: https://www.airbestpractices.com/system-assessments/leaks/finding-and-fixing-leaks.
Shamir, "A Data Science Approach for Device Level Operational State Classification Using Real Time Energy Data", Centrica Business Solutions, 2016, United Kingdom.
International Search Report and Written Opinion of International Searching Authority for PCT/US2018/046229, ISA/RU, Moscow, Russia, dated Dec. 17, 2018.

* cited by examiner

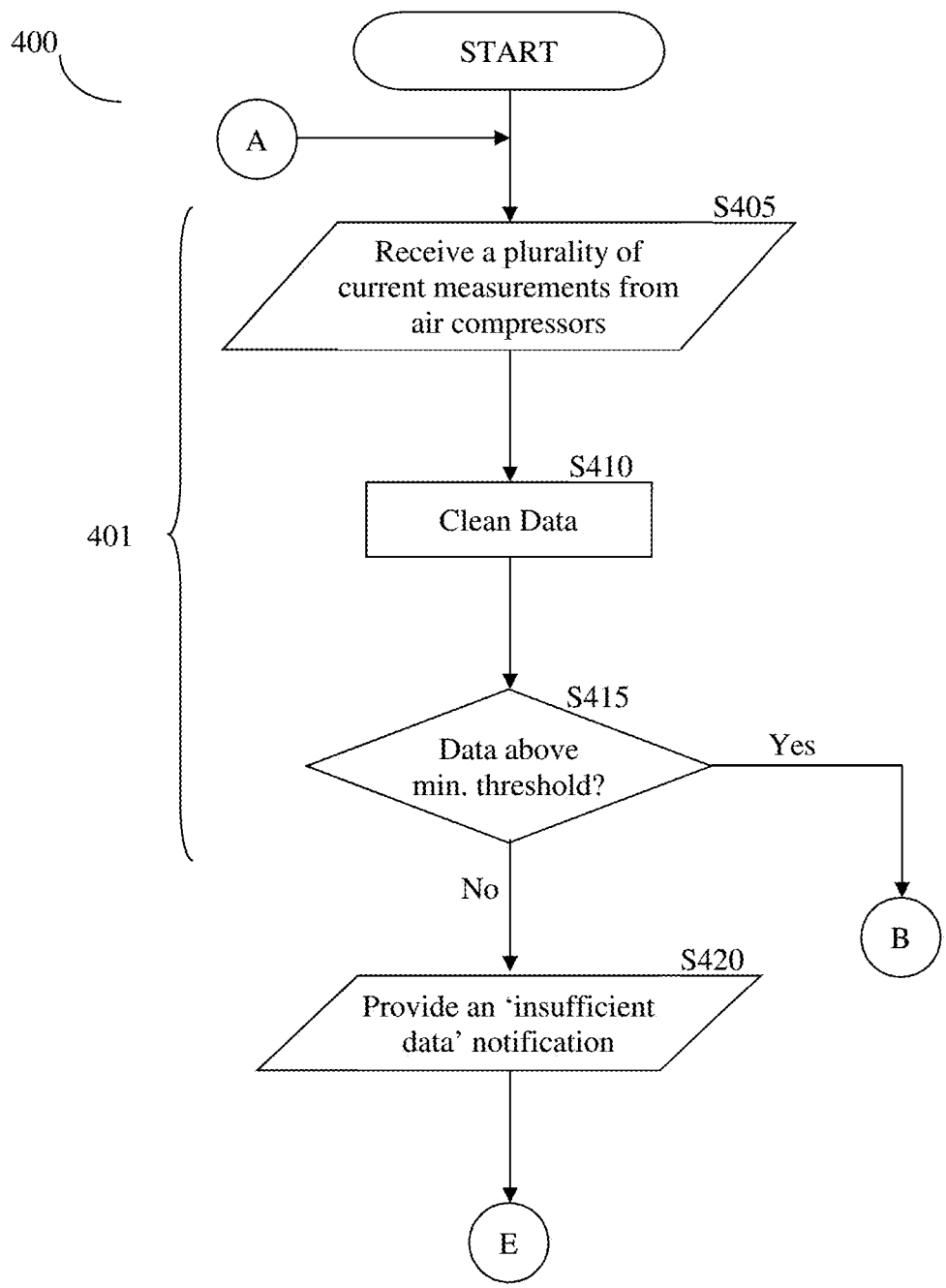
FIGURE 4A (data preparation 401)

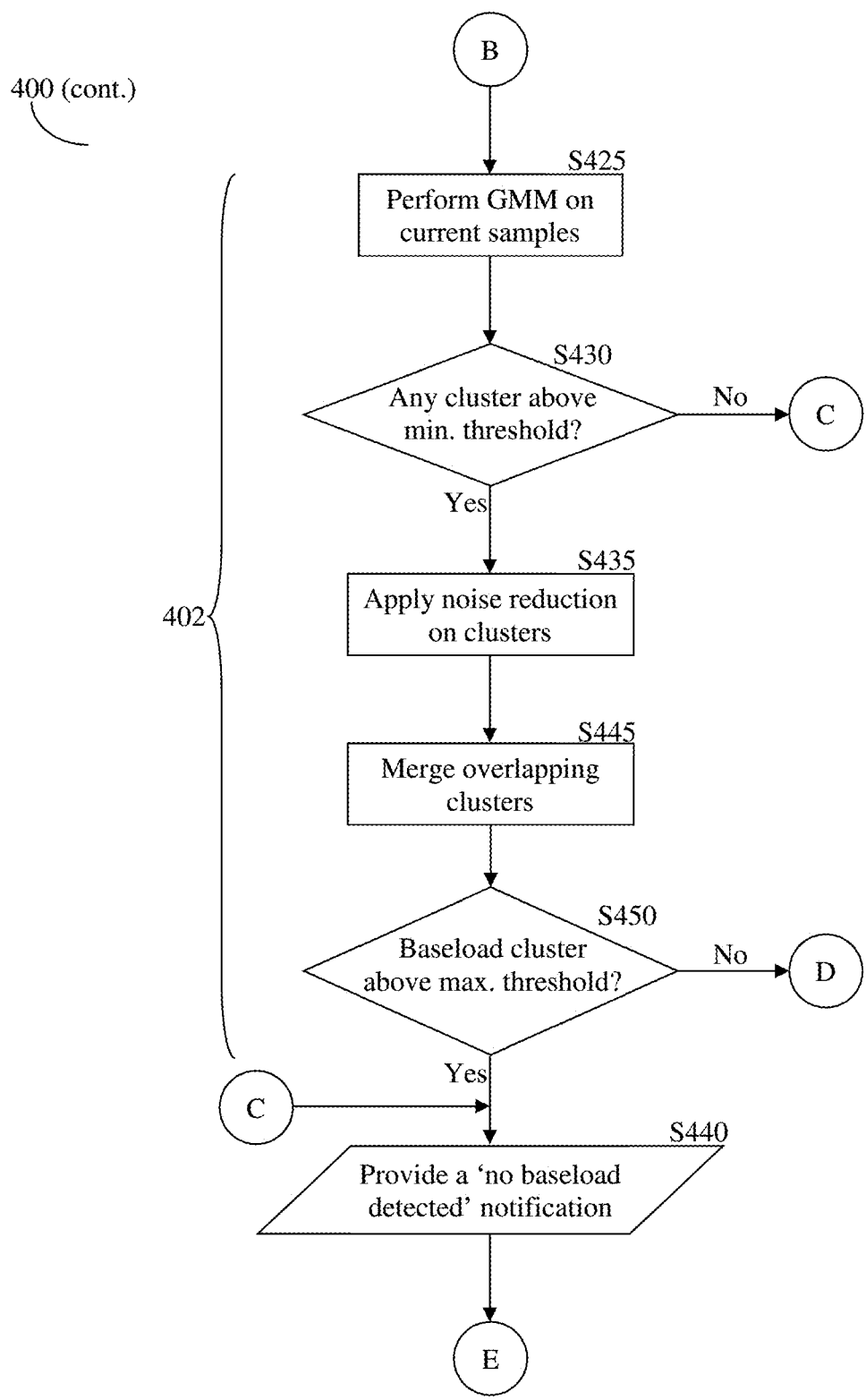
FIGURE 4B (baseload detection 402)

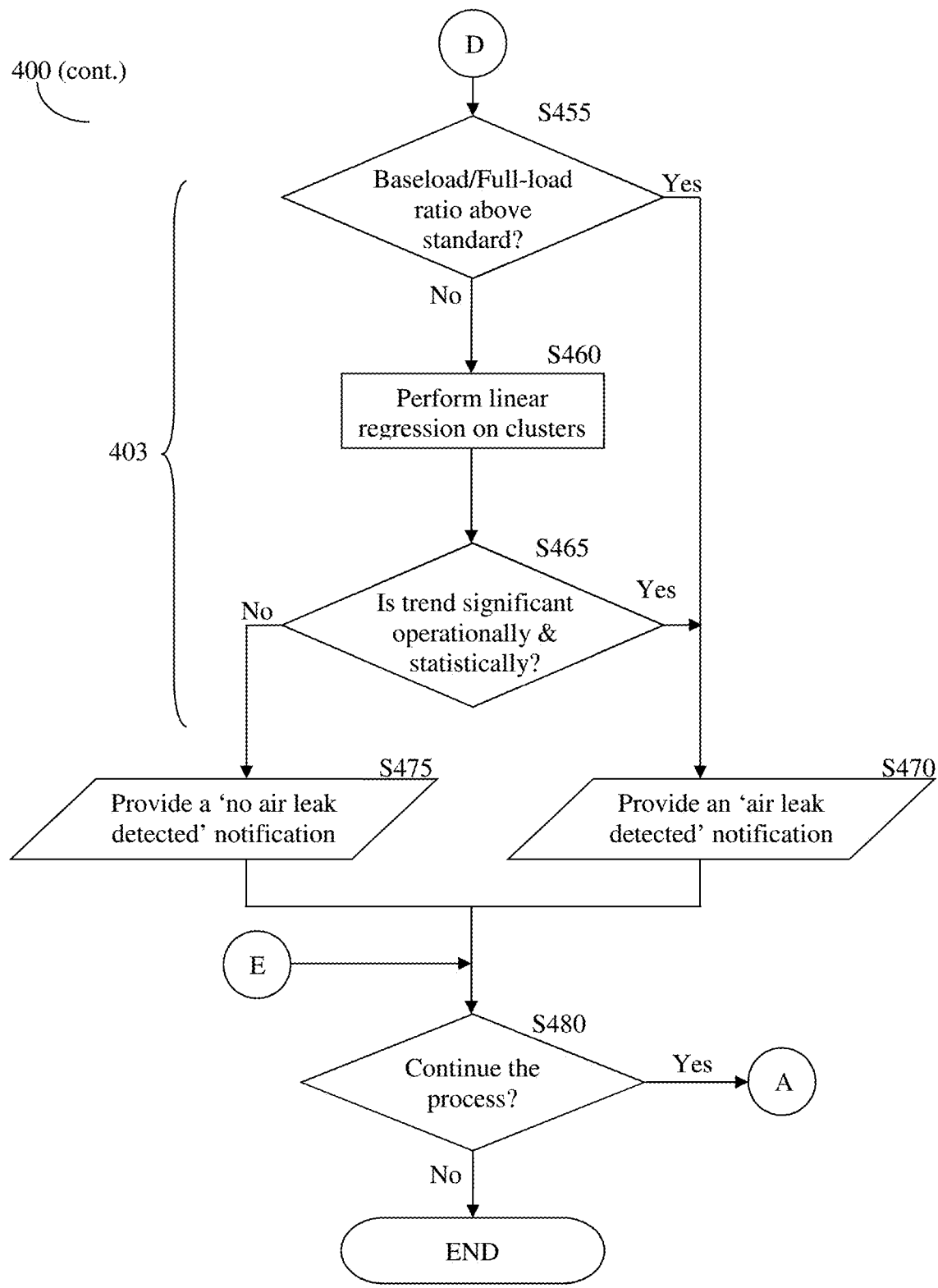
FIGURE 4C (baseload evaluation 403)

IDENTIFICATION OF AIR LEAKS IN A COMPRESSED AIR SYSTEM USING A PLURALITY OF CURRENT MEASUREMENT SENSORS

CROSS-REFERENCE TO RELATED APPLICATIONS

This application claims the benefit of U.S. Provisional Application No. 62/543,394 filed on Aug. 10, 2017, the contents of which are hereby incorporated by reference.

TECHNICAL FIELD

The present disclosure relates generally to systems using compressed air, and more specifically to the identification of air leaks in systems making use of compressed air using self-powered power sensors.

BACKGROUND

Compressed air systems are frequently used in various industrial or commercial facilities such as hospitals and factories. The energy consumed by such systems is substantial and may constitute a significant portion of the total energy consumption of such facilities. In a factory, for example, a compressed air system can contribute up to 40% of the total energy consumption. Air leaks within the system contribute to lost efficiency, and are a common phenomenon typically found within the compressed air system at coupling points, hoses tubes, valves, and other such parts typically found within such a system.

Air leaks may account for significant amounts of wasted energy, and can reach up to 50% of the total compressor production capacity in untreated facilities. Although leaks exist in almost every air compression system at some level, proper detection and repair of such leaks can reduce the lost efficiency to below 10%. This in turn results in significant energy savings and thus reduces operational costs. Leak detection further adds value in maintaining operational efficiency of a facility. A leak may cause an air compressor to cycle more frequently and therefore shorten the life of the equipment as well as increase maintenance cost due to unscheduled repair calls. Moreover, a large leak may lead to a complete failure of the system, causing total downtime which can result in a much-reduced productivity of a facility. Productivity reduction may also be related to the fact that the tools using the compressed air systems work less effectively with a leak, which often causes a drop in the overall system pressure.

Detecting air leaks is challenging and may require advanced sensing capabilities, domain expertise in compressed air systems and intimate knowledge with a specific site's system architecture. Some of the existing analytical methods to detect air leaks include non-direct approaches, such as an analysis of monthly energy bills to discover leaks by growing energy consumption that does not match manufacturing reports. This method is prone to false alarms, as there can be other causes of energy loss besides air leaks. Another method involves starting the compressor repeatedly when there are no demands on the system and measuring the average time it takes to load and unload the compressor. This method is time consuming and requires interrupting the facility's regular routine. A more accurate method to detect leaks is to physically inspect the site using special ultrasonic acoustic detectors which can recognize the high frequency hissing sounds associated with air leaks. An ultrasonic acoustic detector comprises directional microphones, amplifiers, audio filters, and earphones, and requires technicians trained in operating such gear. Additionally, it can often take a long time to detect even very large leaks, and by the time the leak is detected, significant losses have already occurred. Thus, such a method, while somewhat accurate, is both costly and time consuming.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include method for identification of air leaks in a compressed air system. The method comprises receiving system data including current samples of air compressors of the compressed air system from at least one self-powered power sensor; aggregating the system data; dividing the aggregated system data into a plurality of clusters; merging overlapping clusters to reduce the number of clusters to two clusters, wherein a first cluster represents a baseload current and a second cluster represents a full-load current; determining the baseload current to full-load current ratio and comparing the ratio to a predetermined standard; and determining if an air leak is present if the ratio is above the predetermined standard.

Certain embodiments disclosed herein also include an apparatus for identification of air leaks in a compressed air system. The apparatus comprises a processing circuitry; and a memory, the memory containing instructions that, when executed by the processing circuitry, configure the apparatus to: receive system data including current samples of air compressors of the compressed air system from at least one self-powered power sensor; aggregating the system data; divide the aggregated system data into a plurality of clusters; merge overlapping clusters to reduce the number of clusters to two clusters, wherein a first cluster represents a baseload current and a second cluster represents a full-load current; determine the baseload current to full-load current ratio and compare the ratio to a predetermined standard; and determine if an air leak is present if the ratio is above the predetermined standard.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIGS. 4A, 4B and 4C are a single flowchart of a method for detection of air leaks in a system delivering compressed air according to an embodiment.

DETAILED DESCRIPTION

Figure 1:
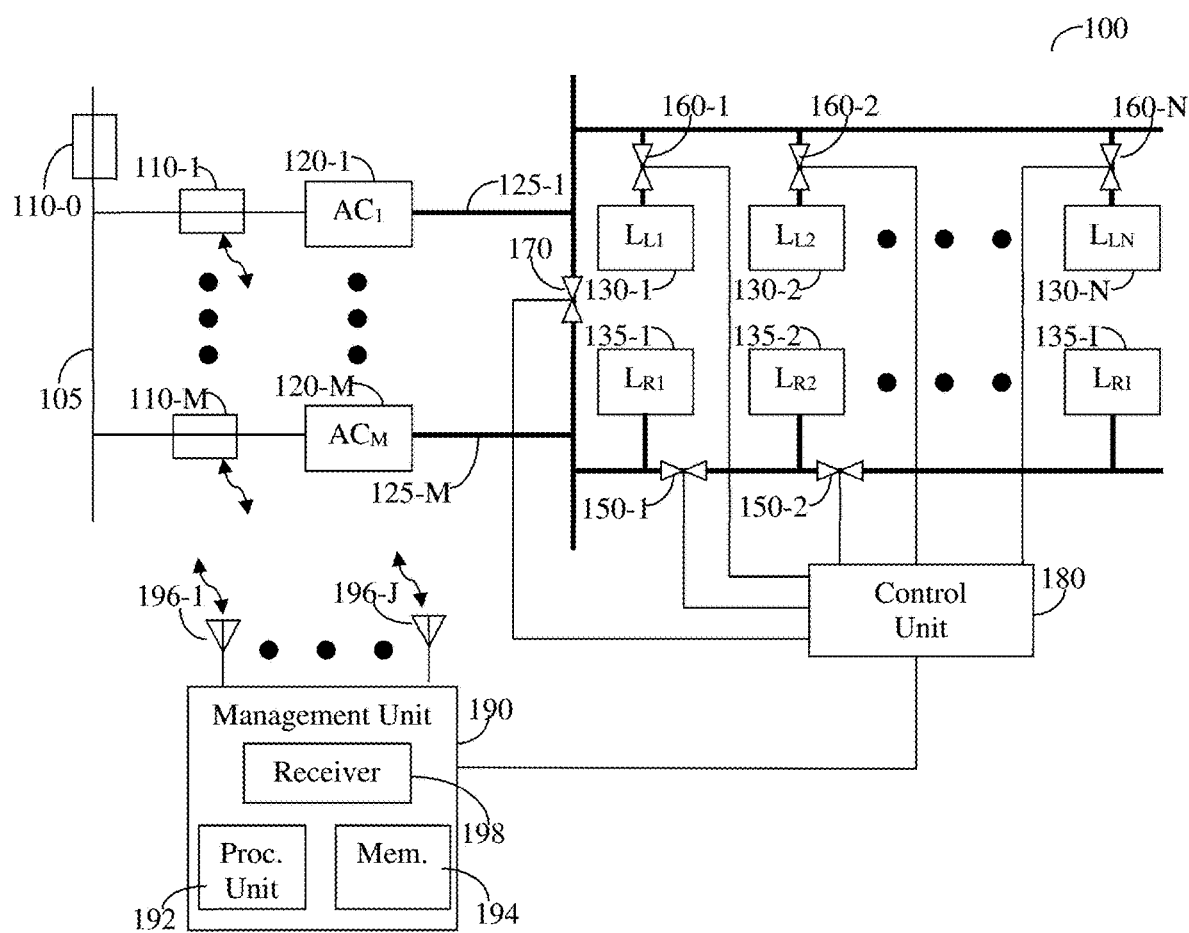
FIG. 1 is a schematic diagram of a compressed air system adapted for identification of air leaks by unsupervised machine learning using a plurality of current sensors according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and apparatus for detecting air leaks in a compressed air system. A compressed air system of air pipes delivers compressed air from one or more air compressors to one or more loads connected to the air pipes. In order to detect air leaks from the air pipes, a plurality of current sensors, e.g., self-powered power sensors (SPPSs), are used to measure periodically the current consumption by the air compressors. The current samples are processed using machine learning techniques to establish a baseload and a full-load model of the system and determining therefrom by a ratio or trend whether there is an air leak in the system. The machine learning includes Gaussian Mixture Model (GMM), linear regression and threshold analysis.

Advances in Internet of Things (IoT), in data analytics, and in energy sensing technologies allow for advanced and cost-effective collection and analysis of data at a device level on a continuous and immediate basis. For example, one of the most advanced technologies in this field is the self-powered power sensor (SPPS), which is a non-invasive wireless current sensor and its related analytics cloud platform. An example implementation of the SPPS can be found in U.S. Pat. No. 9,134,348 titled "Distributed Electricity Metering System" and U.S. Pat. No. 9,678,114 titled "Apparatus and Methods Thereof for Error Correction in Split Core Current Transformers", both assigned to common assignee and which is hereby incorporated by reference. According to an embodiment, such technologies can be adapted to monitor individual compressor units, large or small, or to compressed air systems or racks which include several stacked compressors. By applying an SPPS solution, it is possible to collect granular real-time energy consumption data of individual compressed air systems.

In theory, the obtained energy or current data of the system can be used to detect air leaks, but the analytical process often requires the skills of a human analyst monitoring the data patterns on an ongoing basis and using domain knowledge to identify anomalies. Although some of the new technological advances may reduce the installation time and costs needed to collect the data, a dedicated human analyst resource is often not available. One possible approach is to automate the process by setting thresholds on the data to produce alerts. Such thresholds in the energy level can be fine-tuned to represent a suspected air leak.

While plausible, this is a cumbersome process, as the thresholds still must be determined by a human analyst on a device by device basis. Moreover, as will be described below, even at the individual system level, the energy pattern is often not deterministic and a threshold in the energy level is insufficient to detect an air leak. Another acute problem is that since energy consumption is usually affected by load, it is often found that no fixed threshold can actually differentiate between a legitimate energy increase that is a result of a manufacturing load and an energy increase that is a result of one or more air leaks.

According to an embodiment, a solution requires only a current sensor, e.g., SPPSs, and uses unsupervised machine learning, without the need for a human to review the data and set up thresholds. The use of such an unsupervised approach is a key to scale up the application of air leak detection and remove the human factor from the equation. A further description of an unsupervised approach for determining the operational state of the device using current readings can also be found in U.S. patent application Ser. No. 15/449,187, titled "System and Methods Thereof for Determination of a Device State Based on Current Consumption Monitoring and Machine-Learning Thereof," assigned to common assignee, and which is incorporated herein by reference for all that it contains.

This approach is useful for detecting if a device is in a certain operational state (such as "On" or "Off"). However, compressed air systems possess much more complex behavior. When an air leak evolves, it impacts the base consumption of the system, where the base consumption is defined as the air consumption when no actual load is consuming compressed air. For example, in a factory this can be described as the consumption of the system when all the machines that use compressed air are turned off. It is therefore difficult to detect such air leaks when the system is operational or being used, as the overall energy pattern is a superposition of the leak and the operational current. Since the operational current may vary significantly as a function of the actual load on the system, it is not possible to separate the leak current from the operational current. Therefore, to characterize a leak, it is beneficial to measure the current consumption when the system is not operational such as, for example, during nights or weekends. According to an embodiment, this consumption should be noted as the baseload consumption of the system.

Tracing the actual baseload consumption periods typically requires close familiarity with each facility's routine schedule and with exceptional occasions that include, but are not limited to, extra hours, holidays, planned and unplanned shutdowns and the like. According to an embodiment an unsupervised approach that uses only periodic current measurements is used to identify the baseload consumption periods. However, the baseload consumption does not necessarily represent the leak entirely. It is likely to be, similar to consumption during operating times, a superposition of other consumptions that are related to some natural pressure loss, peripherals of the system, such as control circuits, or other electricity consuming circuits. In that sense, the mere existence of a baseload consumption does not necessarily indicate the existence of an air leak. Instead, an air leak would be suggestive only when baseload consumption not only exists, but also exceeds industry standard for normal baseload consumption, for example, but not by way of limitation, at 10% of the full-load.

FIG. 1 is a schematic diagram of a compressed air system 100 adapted for identification of air leaks by unsupervised machine learning using a plurality of current sensors according to an embodiment. A main powerline 105 feeds a plurality of air compressors 120, for example, air compressor 120-1 through 120-M, where M is an integer equal to or greater than 1, collectively referred to as air compressor 120 or air compressors 120. Note that while the diagram shows a single-phase supply, the solution may be adapted for a 3-phase solution or other potential supply systems without departing from the scope of the disclosure herein.

An SPPS 110-0 may be connected on the main powerline 105 and configured to measure the current flowing through all of the air compressors 120 feeding from the main powerline 105. Without limiting the scope of the disclosed embodiment, an SPPS 110 may be placed on the powerline of each individual air compressor 120, for example air compressor 120-1, and apply the disclosed system 100 individually to each compressor. Moreover, it is possible to place a single SPPS 110 on each compressor power line and aggregate the individual SPPS 110 readings to obtain the total current consumption. Air pipes 125-1 to 120-M, where M is an integer equal to or greater than 1, collectively referred to as air pipe 125 or air pipes 125, lead to loads 130-1 to 130-N and 135-1 to 135-I, where N and I are integers equal to or greater than 1, that make use of compressed air throughout the facility, and may further include valves, such as valves 150, 160 and 170, that may control the flow of air within the pipes 125 as well as into the loads 130 and 135, for example, $L_{L1}$ through $L_{LN}$, where N is an integer equal to or greater than 1, and $L_{R1}$ through $L_{RI}$, where I is an integer equal to or greater than 1. A controller 180 may be used to control the valves, wired (as shown) or wirelessly (not shown) to determine the air flow within the pipes 125 and into the various loads 130 and 135. For example, the controller 180 may control the valve 170 so that all compressors connected to the pipes 125 supply compressed air through the pipes to the loads 130 and 135. However, the controller 180 may control the valve 170 so that the system is in fact separated such that the air compressor 120-1 supplies compressed air only to pipes 125-1 while air compressor 120-M supplies compressed air only to pipes 125-M.

Depending on the structure and placement of valves, control over the routing of airflow throughout the pipes 125 may be achieved. A management unit 190 may be wirelessly connected to the plurality of SPPSs 110 using one or more antennas 196, for example antennas 196-1 through 196-J, where J is an integer equal to or greater than 1, collectively referred to as 196. The management unit 190 may further include a processing circuitry 192 connected to a receiver 198, which in turn is connected to the antennas 196, and further connected to a memory 194 storing instructions therein, the memory 194 communicatively connected to the processing circuitry 192. The execution of the instructions by the processing circuitry 192 configures the management unit 190 to perform unsupervised machine learning that is adapted to learn about air leaks using a plurality of current measurements received from the plurality of SPPSs 110.

While a management unit 190 is described herein, this should not be viewed as a limitation on the disclosed embodiment and other embodiments are possible, including a bridge (not shown) having one or more antennas 196, the bridge communicatively connected to a network (not shown) to which a server (not shown) is connected and where the server performs the machine learning tasks. In one embodiment, a cloud-based implementation of the management unit 190, or portions thereof, is employed where, for example, the processing take place on a cloud-based server. In a further embodiment, a plurality of like bridges may be used that are all communicatively connected, for example using a wired or wireless network or a combination thereof, to the server. While the management unit 190 is described as communicating with SPPSs 110 wirelessly, wired embodiments are also possible and are within the scope of the disclosure.

Figure 2A:
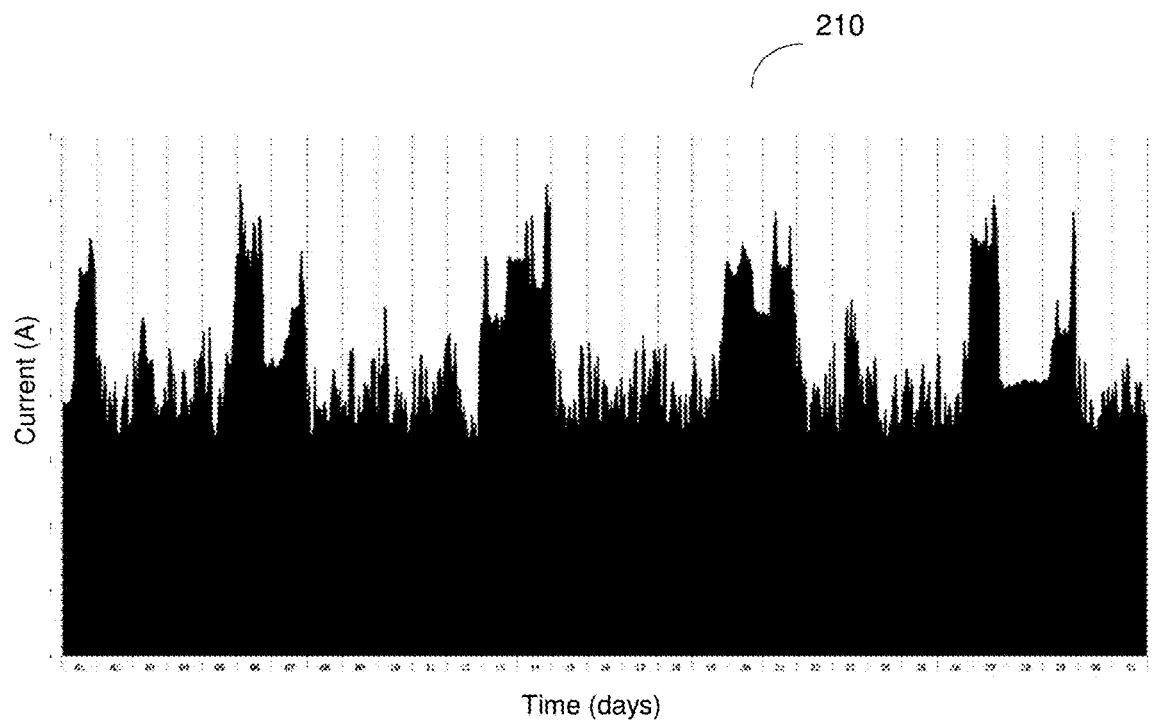
FIG. 2A is a current consumption versus time chart of a first exemplary air compressors of a compressed air delivery system.
Figure 2B:
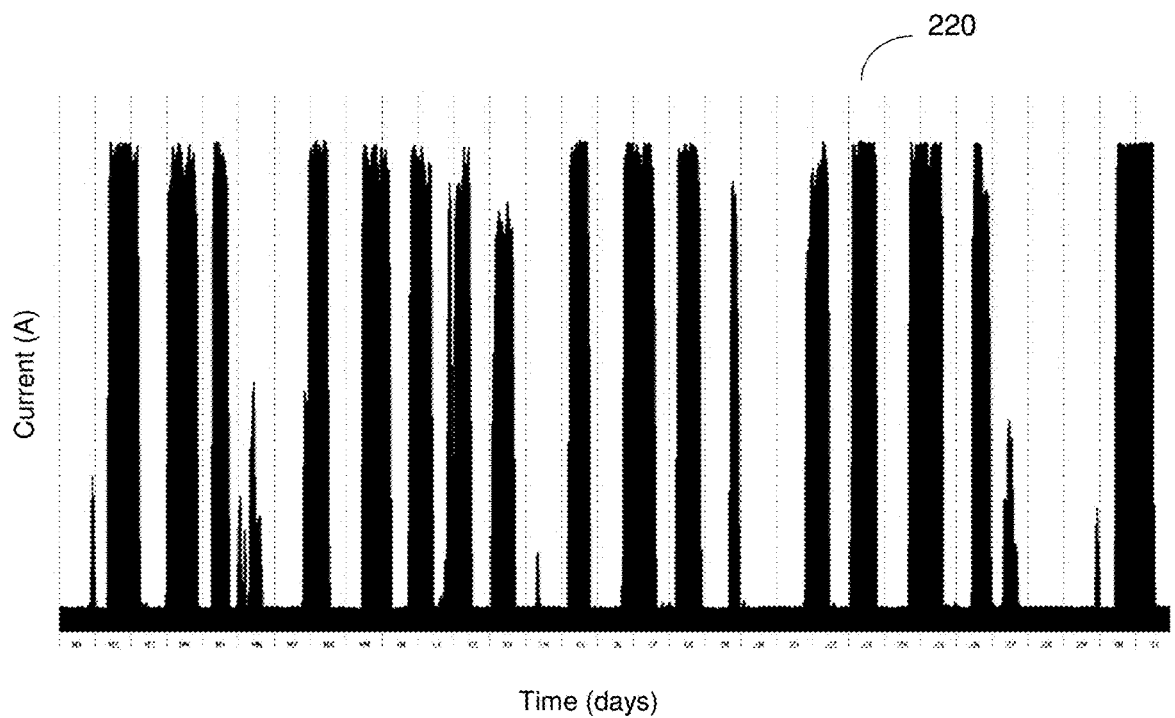
FIG. 2B is a current consumption versus time chart of a second exemplary air compressors of the compressed air delivery system.
Figure 2C:
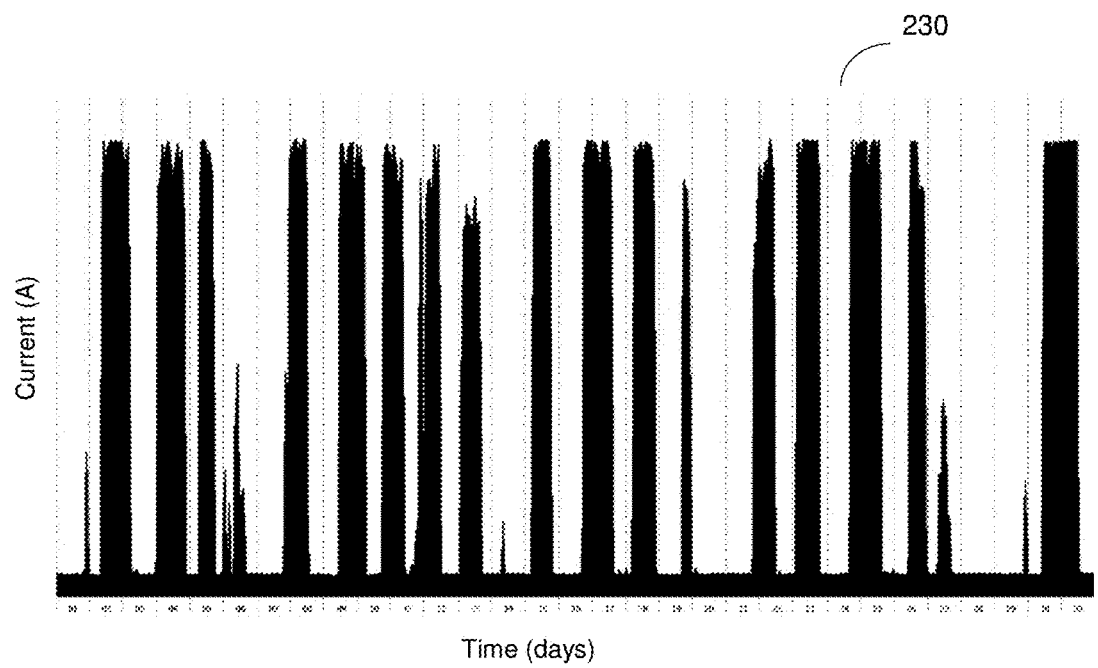
FIG. 2C is a current consumption versus time chart of a third exemplary air compressors of the compressed air delivery system.
Figure 2D:
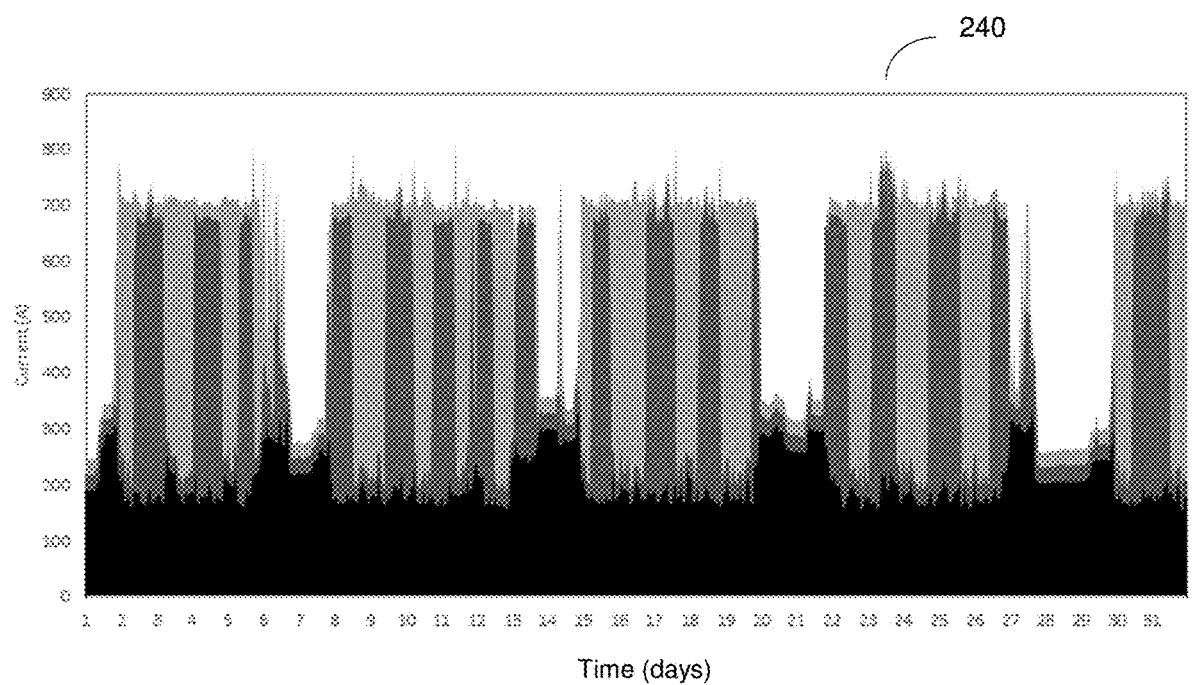
FIG. 2D is current consumption versus time chart that combines the current consumptions shown in FIGS. 2A, 2B and 2C.

FIGS. 2A, 2B, 2C and 2D show example graphs 210-230 of typical compressed air patterns. FIGS. 2A, 2B and 2C show the current time-series of three air compressors within one system over a time period of a month, i.e., the horizontal axis represents time and the vertical axis represents current consumption. FIG. 2D shows a graph 240 of the stacked view of all three air compressors, reflecting the system's total current. While operating, each air compressor's current varies significantly. Yet, the stacked view in FIG. 2D suggests that the different air compressors are operating interchangeably, roughly forming a pattern of rather long "full-load" periods separated by shorter low-power "base-load" periods, which can be inferred to represent working periods versus weekend off hours. Note that this schedule is not evident when looking at each air compressor separately. Therefore, as an air leak is a system characteristic rather than one of any one individual compressor, it is essential to address the case of stacked compressors supporting a single compressed air system.

Figure 3A:
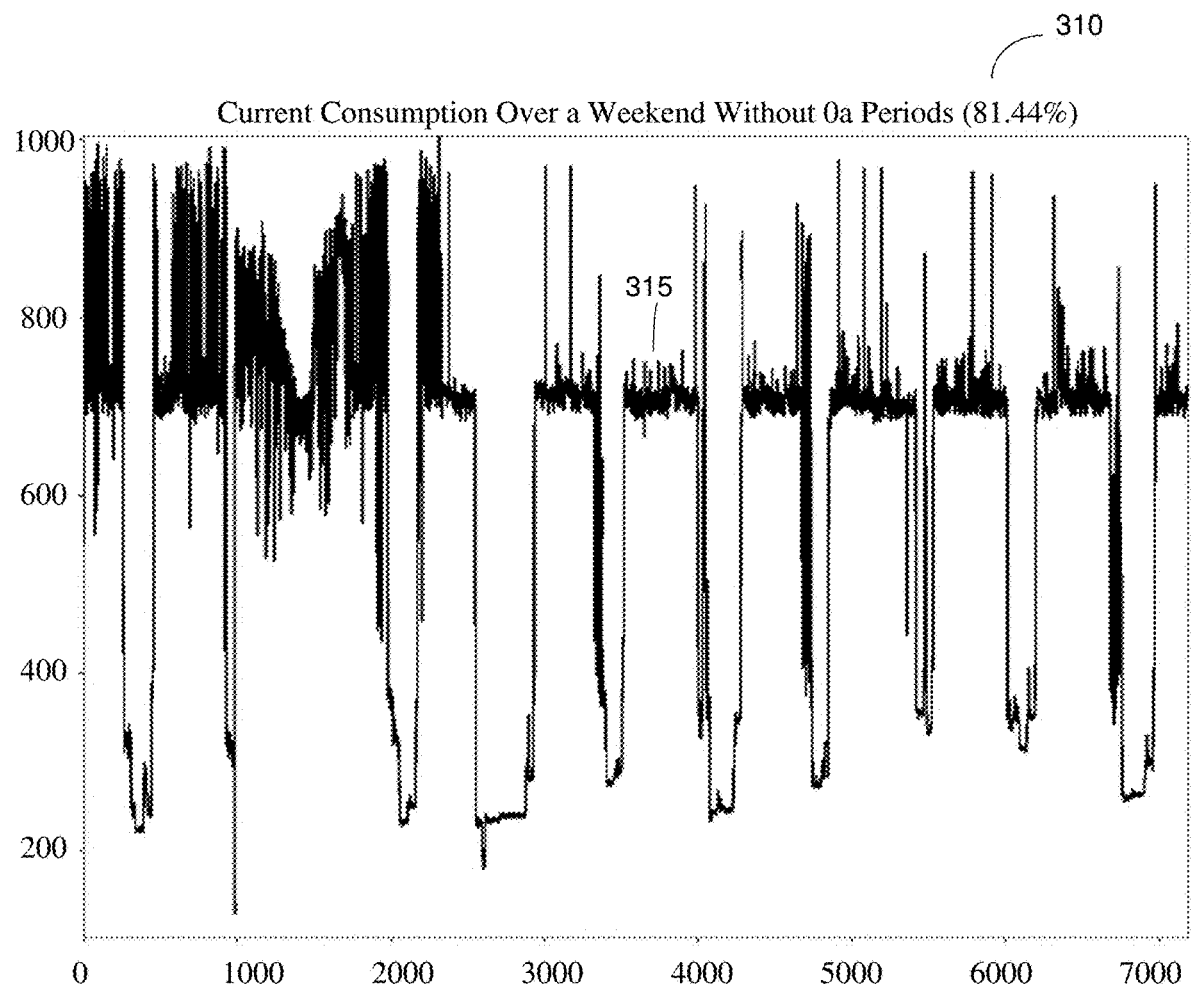
FIG. 3A is a current consumption versus time chart of a system demonstrating stable behavior between baseload and workload.
Figure 3B:
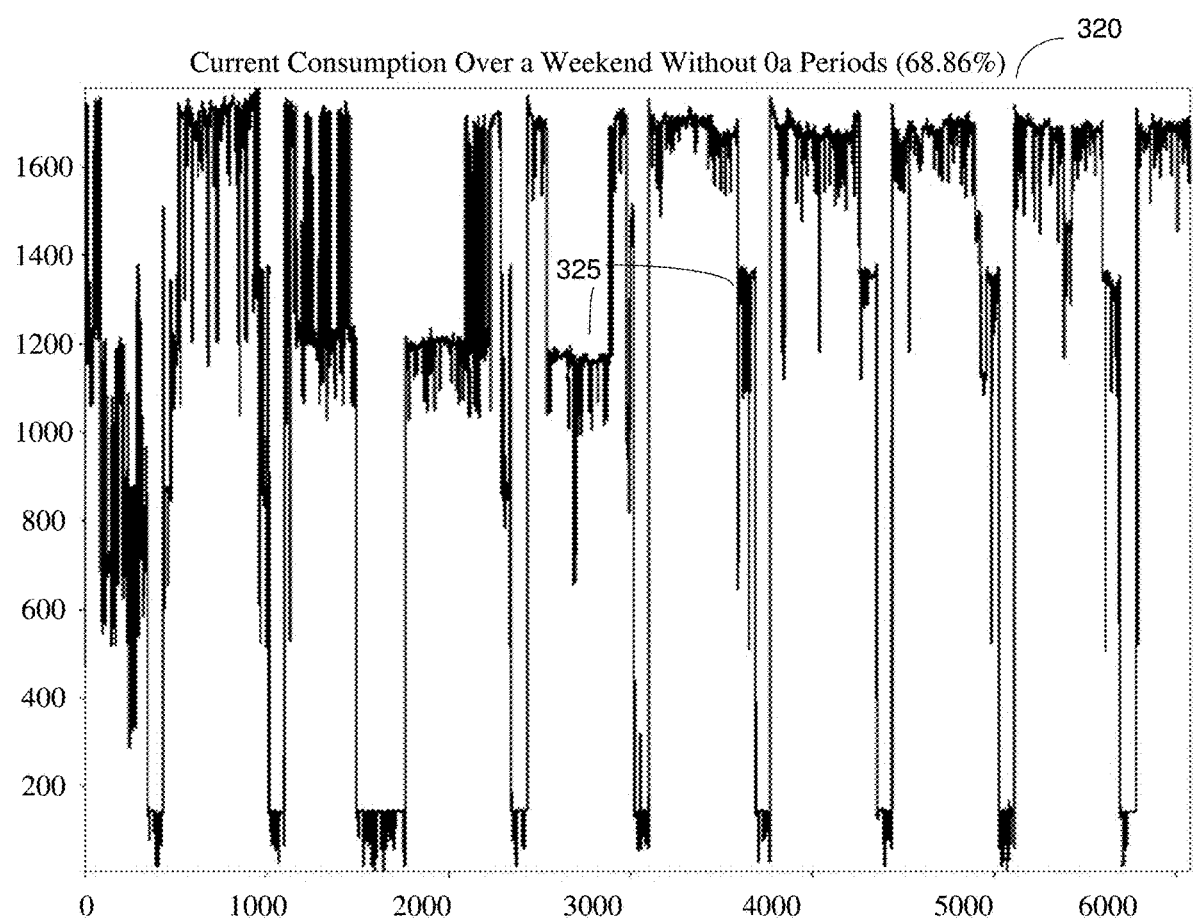
FIG. 3B is a current consumption versus time chart of a system demonstrating unstable behavior between baseload and workload.

FIGS. 3A and 3B show examples graphs 310 and 320 that represent a stable base load and an evolving base load, respectively, according to an embodiment. The graphs depict total current consumption over a 3-month period in two air-compressor systems. Both plots share the general characteristic of shifts between low-current periods, reflecting baseload, and high-current periods, reflecting a workload. Nevertheless, there is a clear distinction between the baseload depicted in FIG. 3A and the one depicted in FIG. 3B. While baseload current 315 shown in FIG. 3A is rather stable during the 3-months period, the baseload 325 shown in FIG. 3B is unstable and seems to gradually increase, likely reflecting an evolving air leak. This is representative of the tendency of an air leak with such a system to develop over time. A hole in an air pipe may begin as a small hole and its size slowly grows over time. That can result in a visible increase of the baseload current consumption. Therefore, learning the evolution of the baseload over time can be used as a method to detect air leaks. According to an embodiment, identification of the baseline evolution assumption using machine learning capabilities enables early detection of evolving air leaks when the waste of energy and resources is still rather low, and further enables the defining of severity and stability of existing leaks.

FIGS. 4A-4C are a single flowchart 400 of a process for detection of air leaks in a system 100 delivering compressed air according to an embodiment. The flowchart 400 includes three main steps: data preparation 401, shown in FIG. 4A, baseload detection 402, shown in FIG. 4B, and baseload evaluation 403, shown in FIG. 4C.

Figure 5:
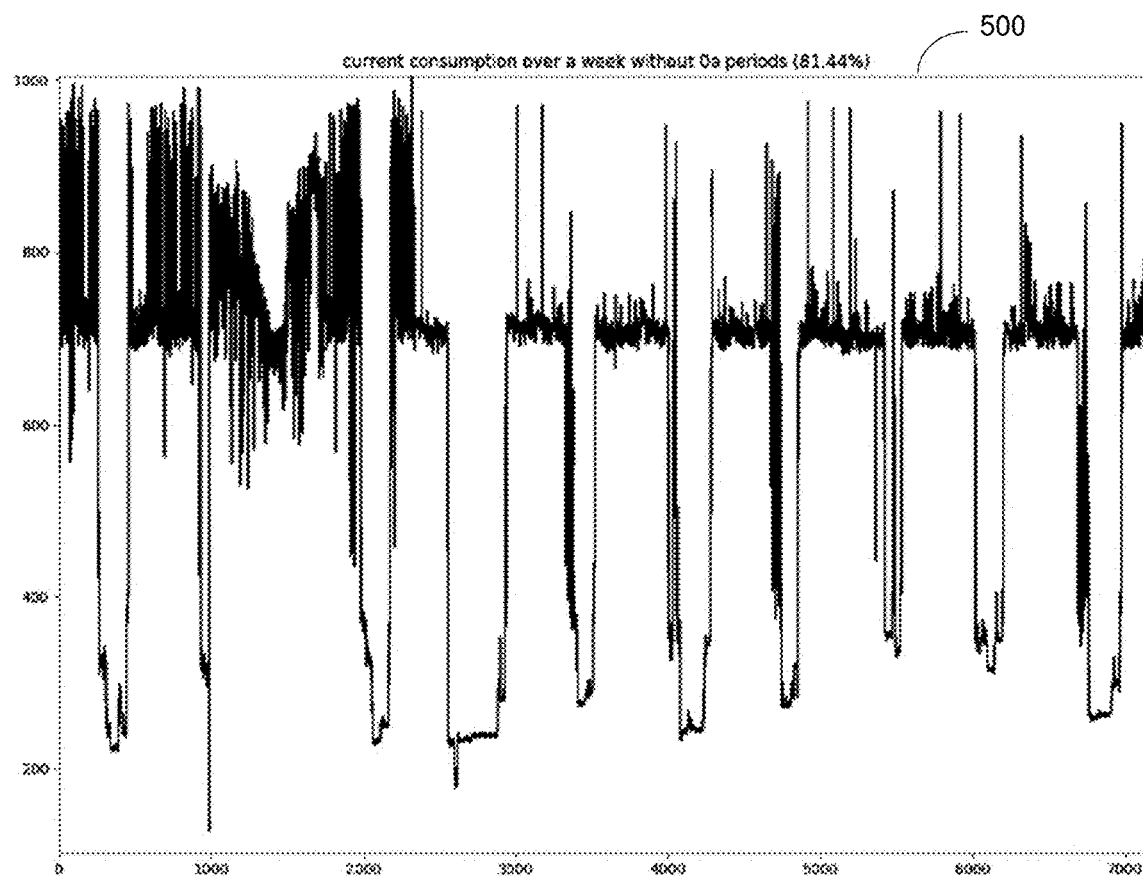
FIG. 5 is a current consumption versus time chart of a total load of an air compressor system.

The data preparation 401 includes system data extraction and system data aggregation. Air compressor current measurements are extracted and averaged to the required resolution to reduce noise, in-rush currents, and currents of all air compressors feeding the same air bank are summed per time-stamp, i.e., aggregated, so that a single time series represents the total load on the air compressor system, as shown in the graph 500 of FIG. 5. In an embodiment, data intervals of 15 minutes are used. Periods in which the total current is zero are omitted, to avoid biasing further analysis by irrelevant values. Data is ready for the next component, i.e., baseload detection 402, only if at the end of this short process there is a large enough portion of the full period's potential data available for further analysis. Typically, but not by way of limitation, at least one month of data is required for the process to operate effectively and throughout that period the system 100 should have been operational (i.e., the SPPSs 110 provide actual current reading and not zero) for at least 10% of the time.

The data preparation 401 begins at S405 where current samples are received from one or more SPPSs 110 that measure the current consumed by the air compressors of the system, e.g., air compressors 120 of FIG. 1. At S410, the data collected is cleaned as discussed hereinabove. At S415, it is checked whether the data is above a minimum threshold value, e.g., if sufficient data point have been collected, and if so execution continues with S425; otherwise, execution continues with S420 where a notification of insufficient data is provided and thereafter execution continues with S480.

The baseload detection 402 may begin with a Gaussian Mixture Model (GMM) algorithm applied to the current samples provided from the data preparation 401 step. The GMM serves as an exemplary and non-limiting example of unsupervised machine learning which clusters the current measurements into sub-populations, representing various load levels of the air compressor system 100. To improve the fit, and to overcome non-Gaussian distributions, the GMM is set to divide the data into a number of clusters. While multiple clusters necessarily imply less data points per cluster, further analysis is done only if at least one of the clusters reaches a minimal percentage of the dataset, since analysis of negligible amounts of data might lead to unreliable conclusions. Setting the inclusion threshold takes this tradeoff into account. Next, widely distributed clusters of noise are removed, and a sequential process of merging overlapping clusters is applied, so that the number of clusters is reduced to two—the "baseload" and the "full-load," as depicted in FIGS. 6 and 7 below.

Figure 6:
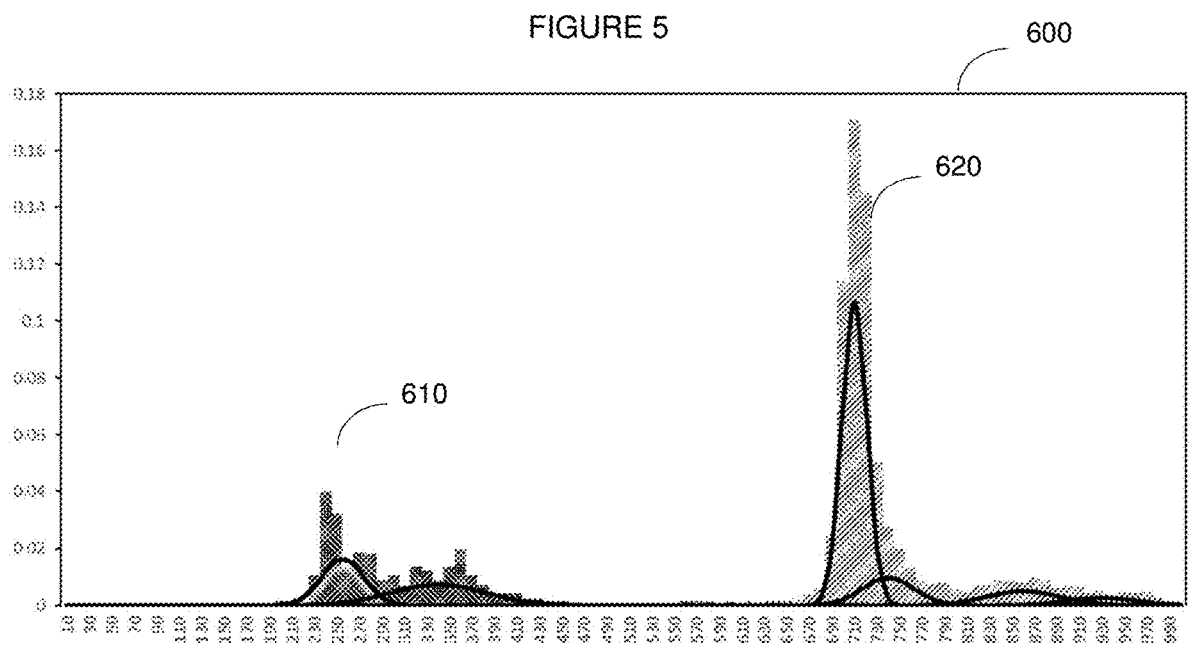
FIG. 6 is a histogram of current consumptions values after processing using a Gaussian Mixture Model (GMM) according to an embodiment.

FIG. 6 depicts an exemplary and non-limiting GMM and current values histogram graph 600. The plot shows the Gaussians suggested by the GMM superimposed on a histogram of the data set. The horizontal axis indicates current values (e.g., in Amps), and the vertical axis represents the frequency within the dataset. The darker bars 610 and lighter bars 620 are data clusters classified as "Baseload" and "Full-load" respectively.

Figure 7:
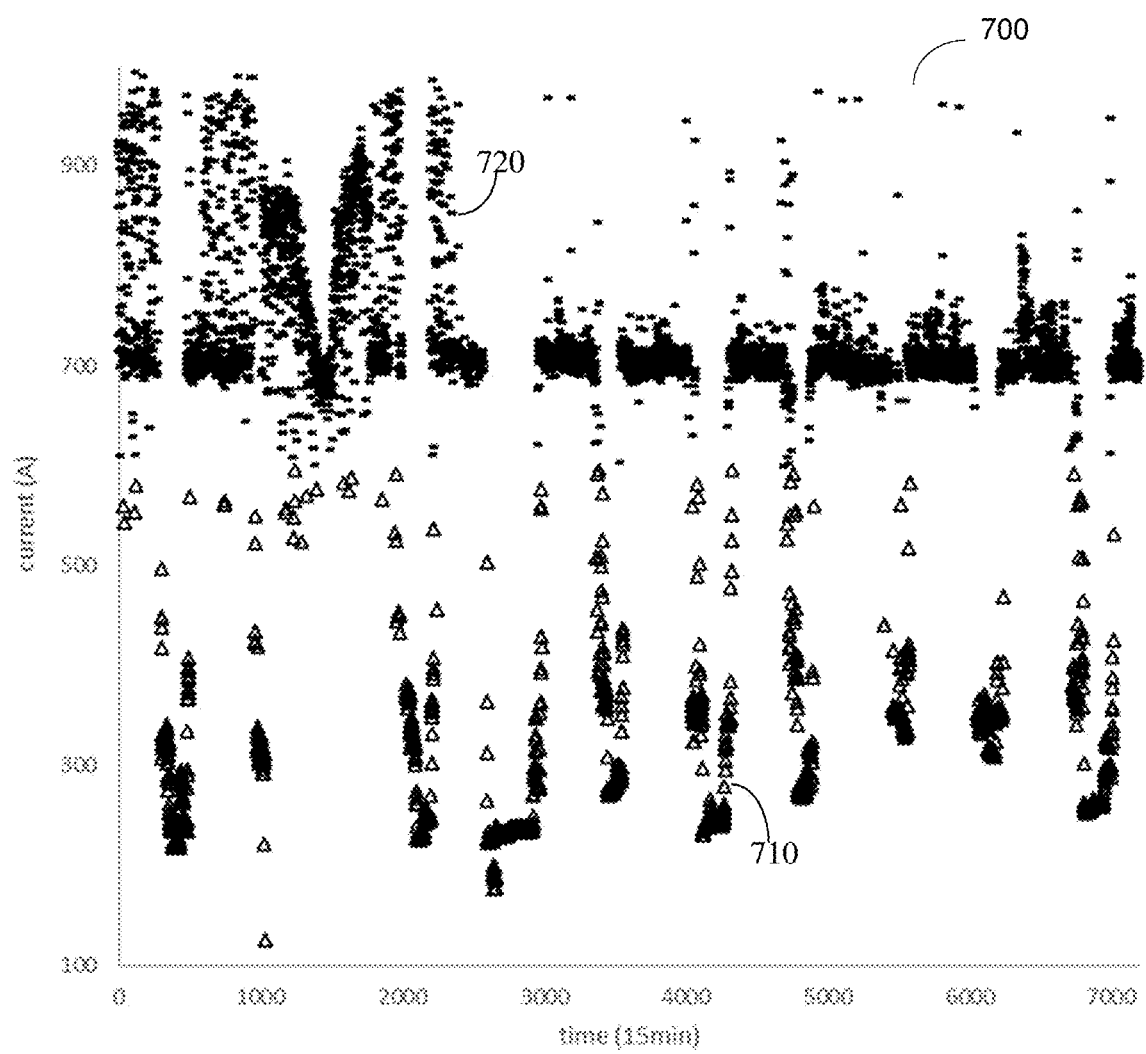
FIG. 7 is a diagram of the baseload detection according to an embodiment.

FIG. 7 shows the a graph 700 of the results of an exemplary and non-limiting baseload detection. The horizontal axis indicates the time (e.g., 15 minute units, over a 3 months period), and the vertical axis indicates the current value (e.g., in Amps). The triangle classification 710 indicates a "baseload" and the rectangle classification 720 indicates a "full-load". Baseload detection is considered reliable, only if "full-load" clusters exist as well, and furthermore—the "baseload" data points do not dominate the dataset and do not exceed a maximal percentage threshold. This limit is based on operational reality, assuming "baseload" is usually not the frequent state of the air compressor system.

Returning to FIG. 4, the baseload detection 402 begins at S425, where a GMM is performed, as described herein, on the current samples after data preparation in step 401. At S430, it is checked whether any cluster is above a minimum threshold value (i.e., has reached at least a minimal percentage of the dataset) and if so, execution continues with S435; otherwise, execution continues with S440 where a notification is provided that no baseload was detected and thereafter execution continues with S480. At S435, noise reduction is performed as discussed hereinabove and at S445, overlapping clusters are merged to avoid unnecessary duplication. At S450, it is checked whether the baseload cluster is above a maximum threshold (i.e., reaches a maximal percentage of the dataset, which in turn means that a full load state does not really exist) and if so, execution continues with S440; otherwise, execution continues with S455.

Finally, once the baseload is successfully detected, the ratio between the average baseload current and the average full-load current is calculated and compared to a predetermined standard, e.g., an industry standard. Ratio values that fall below the standard significantly indicate that there is an air leak in the compressed air system 100. This represents a case in which the baseload energy is significantly high such that it is very likely that an air leak exists and there is a need to immediately provide a notification in S470. If the ratio between the baseload and the full load is below standard according to S455, it is then possible to detect air leaks as they evolve at a relatively early stage by assessing linear regression between baseload current values and their corresponding time-stamps, and calculating the correlation's p-value.

Figure 8:
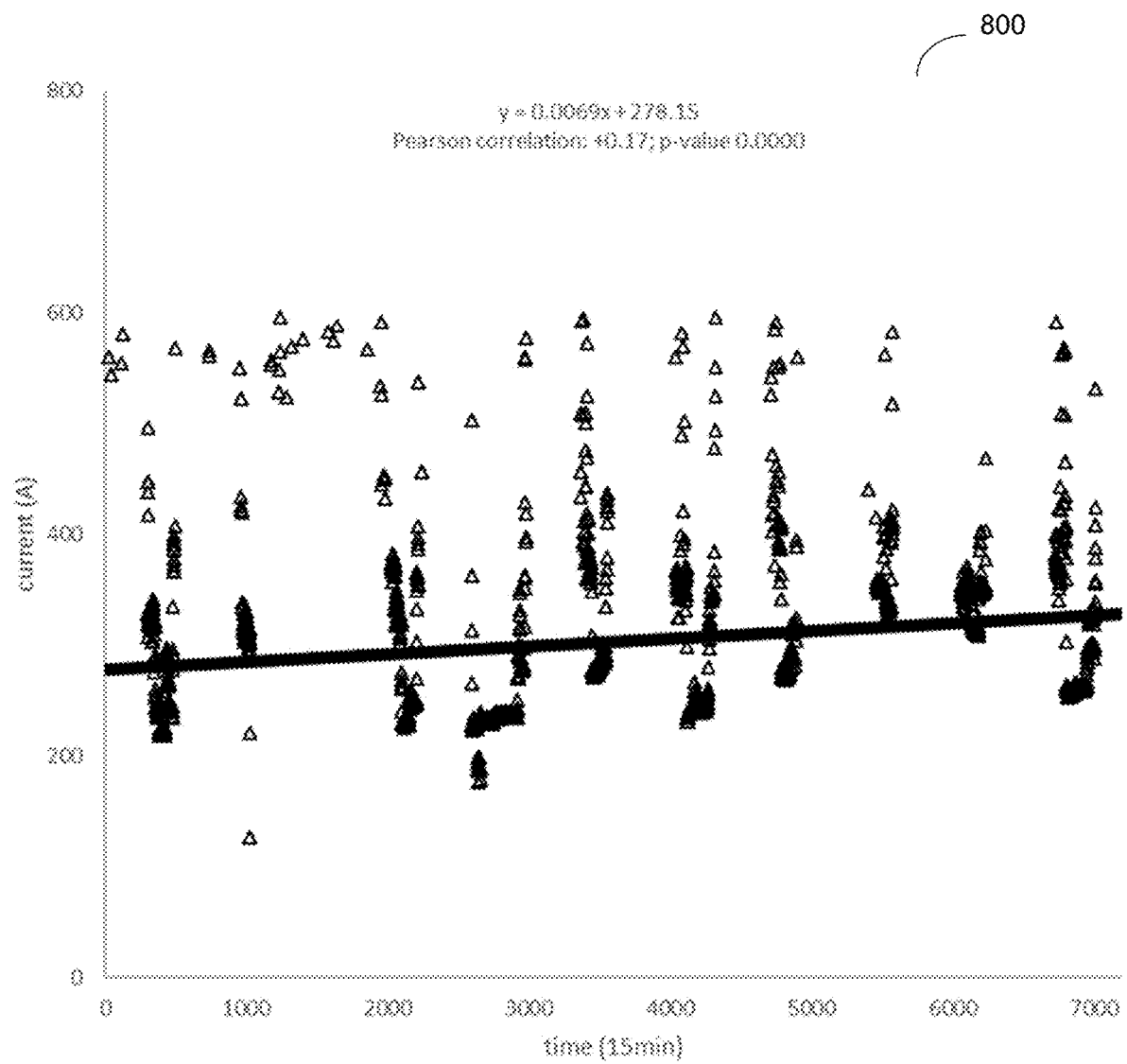
FIG. 8 is a diagram of a baseload trend according to an embodiment.

FIG. 8 shows an exemplary and non-limiting baseload trend, or trendline, according to an embodiment. A final positive "Air Leak" classification may also be detected if the trend is significant, both statistically and operationally. In an embodiment, an "Air Leak" classification is determined if the p-value is above a predetermined threshold. A negligible p-value assesses the statistical significance. From an operational perspective, the trend is considered significant if it is positive, and the increase in baseload current over the sampled period is large enough both relatively, and absolutely. Therefore, two more thresholds are set for the current trend, these are a minimal percentage of growth, and a minimal absolute value of growth over the sampled period. As an example, and without limiting the scope of the embodiment, an operationally significant trend can be an increase of 5% in baseload current over a period of one month.

Returning to FIG. 4, the baseload evaluation 403 begins subsequent to the baseload detection 402, by checking the ratio between the baseload and the full-load to be above industry standard and is so, in S470 an air leak notification is provided after which execution continues with S480; otherwise, execution continues with S460. At S460, a linear regression is performed as described hereinabove. At S465, it is checked whether there is a significant trend both statistically and proportionally and if so execution continues with S470; otherwise execution continues with S475. At S475, a notification that no air leakage has been identified is provided. Such notification should be understood in the context of air leaks in compressed air systems where no leaks are assumed at a leakage level which is below a predetermined leakage threshold. At S480, it is checked whether additional current samples should be processed and if so execution continues with S405; otherwise, execution terminates. In an embodiment, the data received at S405 after each iteration typically repeats the process while amending the entire data collected or, in another embodiment, a portion thereof, for example, a last period of the previously collected data. Furthermore, new data samples collected may also be analyzed as an entirely new data set and subsequently compared against previously analyzed data sets.

Several thresholds may be fine-tuned according to a desired outcome. Liberally set thresholds can improve sensitivity and detection rate, the price being an increase of false alarms. A stricter set of thresholds may improve specificity and reduce false alarms, the price being in an increase of missed and undetected air leaks. Furthermore, in a typical embodiment, one minute current readings over a period of three months may be used in each iteration of the system, which corresponds to approximately 130K data points. To determine the thresholds, an initial analysis may be needed of several hundreds of units including tagging of actual air-leak situations, which corresponds to a few billion data points, hence clarifying the need for an automated solution presented herein.

Such a large number of data points cannot be effectively processed without a significant degree of automation. As an example implementation, it is possible to detect a leak of a particular dataset of a distribution center. Using the solution described herein, it is possible to detect the baseload during weekends, e.g., if it is very high and growing. Within a period of time, e.g., three weeks, if a baseload consumption reaches a threshold, e.g., 40% of the full-load, it can be determined that this energy was needed to supply some key systems and keep the system up to pressure. This result indicates a suspected air leak in the pipes of the system.

In an embodiment it may be possible to use the valves (e.g., 150 and/or 160 and/or 170 of FIG. 1) to connect various portions of the compressed air delivery system. For example, valve 170 may separate the air pipes 125 into two subsystems, air pipes 125-1 and air pipes 125-M. In complex layouts of air pipes, it may be advantageous to segment the air pipes and check for leaks in various segments thereby allowing directing towards a segment that exhibits leakage characteristics. In a single facility, there may be a complex and long network of air pipes and any assistance in directing an investigation to a leak in a more effective and efficient manner is beneficial. In such cases, baseloads and full-loads may be determined for each segment without departing from the scope of the disclosed embodiment.

Figure 9:
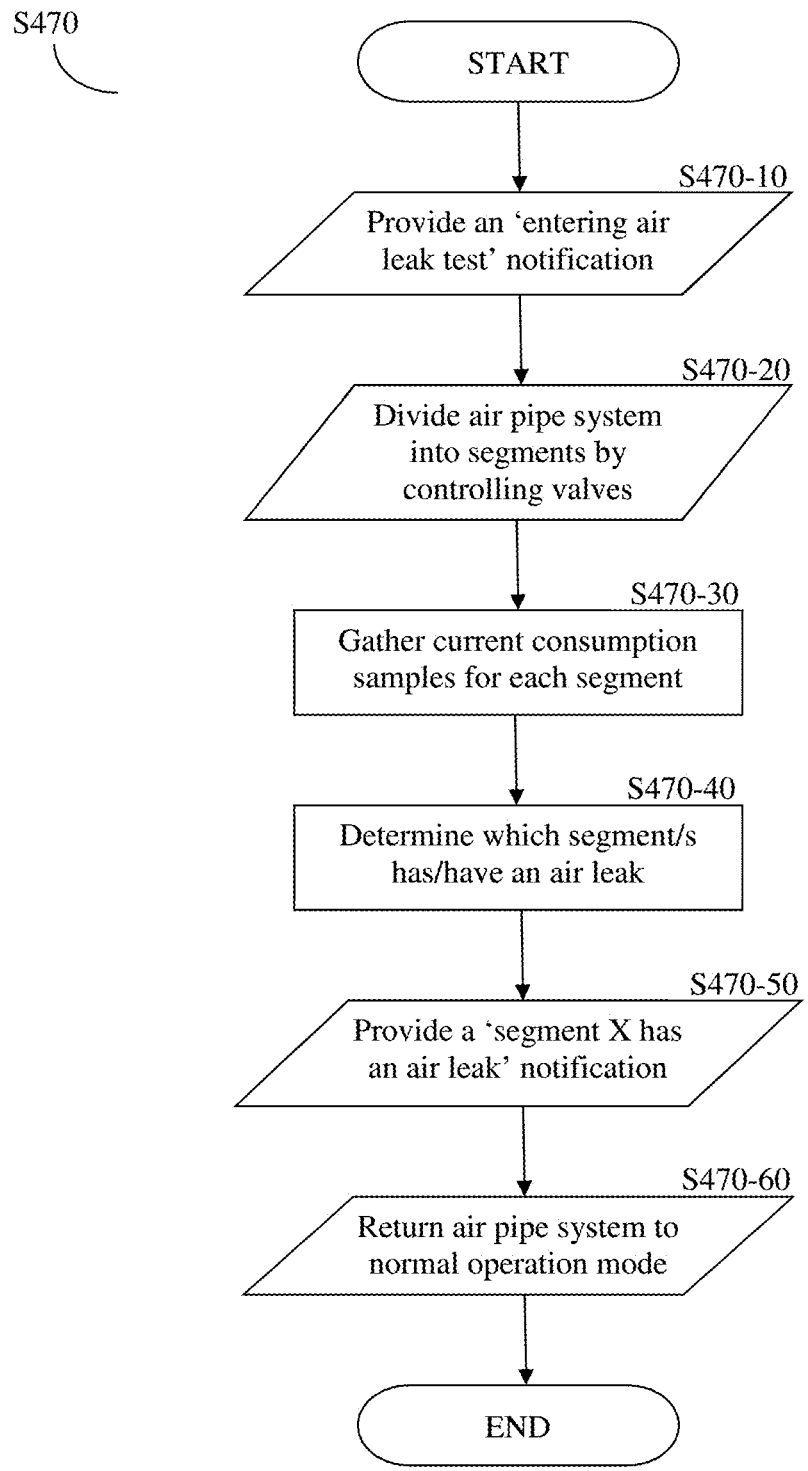
FIG. 9 is a flowchart of a method for detection of an air leak in a segment of air pipes according to an embodiment.

Reference is now made to FIG. 9, which is a flowchart S470 of detection and notification of an air leak in a segment of air pipes according to an embodiment. The S470 notification of an air leak shown in FIG. 4 is replaced, according to the embodiment, with the flow described herein.

At S470-10, a notification is provided at the beginning of an air leak test.

At S470-20, a management unit, unit 190 of FIG. 1, commands the controller 180 to segment the air pipes 125 into at least two segments by controlling air valves, e.g., air valve 170 of FIG. 1 (which may be configured to separate the air pipes into two separate subsystems 125-1 and 125-M).

At S470-30, current measurement samples are collected over a predetermined period of time, e.g., one week, for detecting a baseload for each segment and comparing its value to the corresponding baseload values previously detected, which is performed in S470-40. The process for such detection is similar to the one discussed herein above with respect of the entire air pipe system. This can be achieved in a shorter period of time with less data samples due to the knowledge previously obtained, for example, but not by way of limitation, in the initial analysis. Furthermore, at S470-40 it is determined in which of the segments (one or more) there is an air leak.

At S470-50, a notification is provided as to the segment or segments that show an air leak. At S470-60, the management unit 190 instructs the controller 180 to return the air pipes 125 to their normal operational state, thereby concluding S470. The flowchart S470 described with respect of FIG. 9 may be readily adapted to perform in additional embodiments without departing from the scope of the disclosure. For example, and without limitation, upon segmentation, only a portion of the segments are tested for air leaks. If a leak is found in one of these segments the leak has been identified, otherwise, other air pipe segments are checked. In yet another exemplary embodiment, each segment is checked separately to identify which one or more segments are leaky. In yet another exemplary embodiment one segment of air pipes is switched off of the system and it is checked whether the rest of the air pipes do not present air leaks. Then, a conclusion can be made that the shut-off segment is the one containing a leak. Such embodiments, and other like embodiments, are straightforward adaptations from the ones described herein and are well within the scope of this disclosure.

Figure 10:
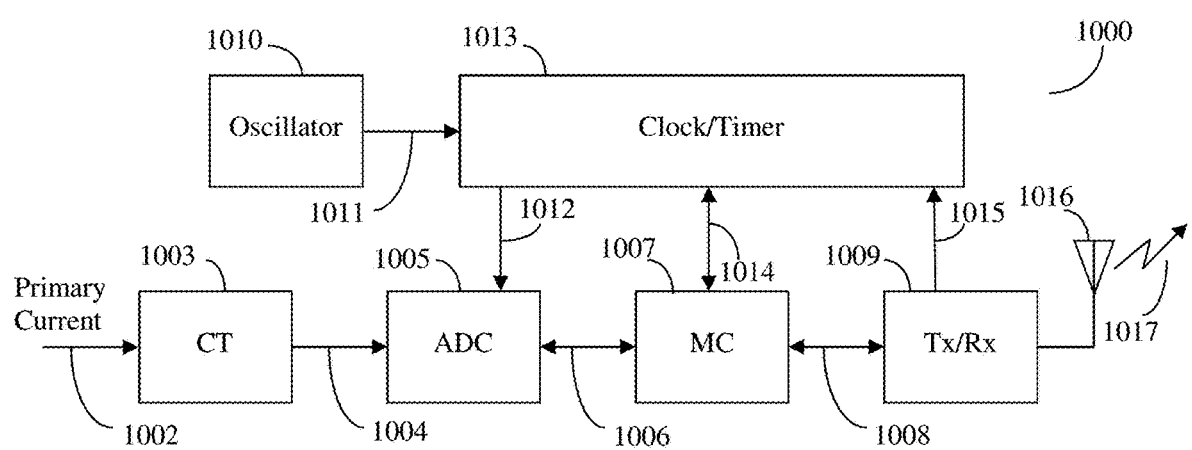
FIG. 10 is an example diagram of a self-powered power sensor (SPPS) according to an embodiment.

FIG. 10 is an example diagram of an SPPS 1000 according to an embodiment. The SPPS 1000 includes a current transformer (CT) 1003 having its primary winding accepting the primary current 1002. It further includes an analog-to-digital converter (ADC or A/D) 1005 that converts the analog signal 1004 into a series of digital samples 1006 under the control of a clock or timer 1013 and a microcontroller (MC) 1007. The samples 1006 gathered by the ADC 1005 are processed by the MC 1007 and then, using the transceiver 1009, processed information is transmitted using antenna 1016. An oscillator 1010 oscillates at a desired frequency and feeds to the clock or timer 1013. U.S. Pat. No. 9,134,348 entitled "Distributed Electricity Metering System" and which is assigned to common assignee, describes in further details such an exemplary SPPS. The power sensed in that embodiment is used for three purposes: to provide the power needed for the operation of the SPPS 1000; to detect the actual power consumption or current of the load connected to the power line 1002; and to detect and time stamp the phase of the current signal.

The following description is focused on the detection of the actual power consumption of the load connected to the power line 1002 and to the detection and time stamping of the phase of the current signal. Specifically, to accurately measure the power consumption of the load, it is necessary to measure the power factor, which is a factor that contains information on the phase difference between the voltage and the load current, as well as the distortion of the load current and voltage from a pure sinusoidal wave. In standard power measuring systems, voltage and current are simultaneously measured by the same physical device and therefore the relation between the two signals is easy to determine and measure.

According to one embodiment, the input current signal (i.e., the signal sampled from the power line) 1002 is transformed by the current transformer 1003 to an analog signal 1004 which can be sampled by an ADC 1005 connected to a microcontroller 1007. The analog signal 1004 is a periodic signal representing the load current with a frequency equivalent to the grid frequency. Such a signal typically is a sinusoidal or close to sinusoidal waveform, but may also be highly distorted and include high-order harmonics. Typically, the CT analog signal is a current signal connected to a small resistor (e.g., a current sense resistor—not shown in the figure). The voltage generated across the sense resistor is then sampled by the ADC 1005.

The ADC 1005 can sample the input signal 1004 with a sampling clock 1012 which can be provided by the clock or timer 1013. For example, this clock sampling 1012 can be 3,200 Hz when sampling 50 Hz signals. In one embodiment, the clock or timer 1013 is driven from a clock 1011 provided by an oscillator 1010. The samples 1006 can be stored in the MC 1007, for example, in a memory therein or a memory connected thereto (not shown), for further processing. In one embodiment, the MC 1007 is in standby mode when triggered 1014 by the clock or timer 1013 to exit standby mode and start processing. This trigger may be an interrupt signal provided by the clock or timer 1013.

When the MC 1007 wakes-up, the MC 1007 is configured to program the clock or timer 1013 and the ADC 1005 to start sampling the signal 1004. The number of samples may include at least a half cycle of the signal (e.g., 32 samples when sampling a 50 Hz signal with a 3,200 Hz sampling clock). Once the samples 1006 have been stored, the MC 1007 is configured to process the samples to roughly estimate the start of a cycle (Ts) of the input signal 1004.

In an embodiment, once the start of the cycle (Ts) has been estimated, the MC 1007 can program the clock or timer 1013 to force the ADC 1005 to start a new burst of samples (e.g., 32 samples) at Ts. Since the start of the sampling is triggered by the clock or timer function 1013, and not by a software command from the MC 1007, the time-stamp of all the samples can be accurately recorded. According to one embodiment, the MC 1007 may estimate the time of the zero-crossing point ($T_1$) of the sampled signal 1006. Accurately estimating the time of the zero-crossing point enables accurate measurement of the load power factor. This may be the 0° or 180° zero-crossing of the periodic load signal. Other embodiments disclosed herein may include estimating the peak (positive or negative) of the signal; however, due to the low derivative of a sinusoidal signal around the peak, such estimate may not be particularly accurate.

In one embodiment, the zero-crossing point ($T_1$) estimation may be done by linear interpolation or extrapolation, or may include more sophisticated and accurate methods such as non-linear regression or similar methods. For example, in a linear approximation, linear regression can be applied on the last two samples prior to the zero-crossing, represented by samples Sa and Sb and times Ta and Tb accordingly, to find the constants a and b of a linear equation S=a*T+b representing the part of the signal that is close to the zero-crossing. Applying S=0 will yield $T_1$ which is the zero-crossing point. In another embodiment, $T_1$ can be taken simply as the time of the first sample where the sample value changes sign between positive and negative or vice versa, or the average of the times of the two samples in which the analog signal changes sign, although the latter two may be less accurate if the sampling rate is not sufficiently high. In certain embodiments, estimating the zero-crossing point with an accuracy of ±0.5° may be sufficient for estimating the power factor, while other embodiments may require different levels of accuracy.

Without interrupting the clock or timer operation 1013 (to avoid losing synchronization to the time-stamped samples and estimated zero-crossing time $T_1$), the SPPS 1000 may start transmitting a wireless message 1017 to a central controller (not shown). For that purpose, a radio frequency (RF) transceiver 1009 is coupled to the MC 1007 and to an antenna 1016 to provide one or two-way communication with a central controller.

In one embodiment, the RF transceiver 1009 supports transmission only, i.e., uplink communication. Moreover, it should be noted that the method is designed to enable accurate power factor measurement using only an uplink communication. This advantage avoids activating the SPPS in receive mode in order to save energy with a self-powered device. However, the RF transceiver 1009 may include a receiver portion to support features such as, but not limited to, sensing for a carrier signal, clock synchronization, acknowledgement, firmware download, configuration download, and the like. Typically, this should be an unlicensed industrial scientific medical (ISM) band transceiver, operative, for example and without limitation, at 2.4 GHz or sub GHz bands.

Upon determination that a transmission is to take place, the MC 1007 prepares a message 1008 to be transmitted. The message 1008 is typically a single packet of data that may contain various types of information and includes the SPPS's unique identification (UID) which enables a central controller to positively associate the current data received with previous data handled by the central controller with respect of the SPPS 1000. The transmitted message 1008 may include different fields of information. One of those message fields may be a SYNC field which is typically transmitted following a message preamble. The SYNC field allows an accurate time-stamping 1015 by the clock or timer 1013 of the message transmission time ($T_2$).

In an embodiment, the message 1008 packet may include, without limitations, various SPPS status information, hardware version, software version, alerts such as overload, average current, SPPS temperature, time-stamped samples, input signal characteristics, power off indication, e.g., upon identification that the load was turned off, and other system parameters. Such parameters may be saved until such time of transmission in the MC 1007 memory (not shown). A cyclic redundancy code (CRC) calculation, forward error correction (FEC), or data redundancy may be further added to a packet for data validation at the receiver side.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for identification of air leaks in a compressed air system, comprising:
    receiving system data including current samples of air compressors of the compressed air system from at least one self-powered power sensor;
    aggregating the system data;
    dividing the aggregated system data into a plurality of clusters;
    merging overlapping clusters to reduce the number of clusters to two clusters, wherein a first cluster represents a baseload current and a second cluster represents a full-load current;
    determining the baseload current to full-load current ratio and comparing the ratio to a predetermined standard; and
    determining if an air leak is present if the ratio is below the predetermined standard.

2. The method of claim 1, wherein aggregating the system data further comprises: extracting and averaging air compression current measurements.

3. The method of claim 1, further comprising:
    applying noise reduction to the plurality of clusters.

4. The method of claim 1, further comprising:
    providing a notification when an air leak is determined to be present.

5. The method of claim 1, wherein dividing the aggregated system data into the plurality of clusters further comprises: applying a gaussian mixture model (GMM).

6. The method of claim 1, further comprising:
    performing a linear regression between the baseload current and corresponding time-stamps.

7. The method of claim 6, further comprising:
    determining if a trend of the linear regression is above a predetermined threshold.

8. The method of claim 7, further comprising:
    determining the air leak when a p-value of the linear regression trend is above a predetermined threshold.

9. The method of claim 1, further comprising:
    segmenting air pipes of the compressed air system into at least two segments if an air leak is determined to be present;
    collecting current measurement samples for each segment over a predetermined period of time; and
    determining, if the air leak is present, which segment contains the air leak.

10. The method of claim 9, further comprising:
    providing a notification of which segment contains the air leak.

11. A non-transitory computer readable medium having stored thereon instructions for causing a processing circuitry to perform a process, the process comprising:
    receiving system data including current samples of air compressors of a compressed air system from at least one self-powered power sensor;
    aggregating the system data;
    dividing the aggregated system data into a plurality of clusters;
    merging overlapping clusters to reduce the number of clusters to two clusters, wherein a first cluster represents a baseload current and a second cluster represents a full-load current;
    determining the baseload current to full-load current ratio and comparing the ratio to a predetermined standard; and
    determining if an air leak is present if the ratio is below the predetermined standard.

12. An apparatus for identification of air leaks in a compressed air system, comprising:
    a processing circuitry; and
    a memory, the memory containing instructions that, when executed by the processing circuitry, configure the apparatus to:
    receive system data including current samples of air compressors of the compressed air system from at least one self-powered power sensor;
    aggregate the system data;
    divide the aggregated system data into a plurality of clusters;
    merge overlapping clusters to reduce the number of clusters to two clusters, wherein a first cluster represents a baseload current and a second cluster represents a full-load current;
    determine the baseload current to full-load current ratio and compare the ratio to a predetermined standard; and
    determine if an air leak is present if the ratio is above the predetermined standard.

13. The apparatus of claim 12, wherein the apparatus is further configured to: extract and average air compression current measurements.

14. The apparatus of claim 12, wherein the apparatus is further configured to:
    apply noise reduction to the plurality of clusters.

15. The apparatus of claim 12, wherein the apparatus is further configured to:
    provide a notification when an air leak is determined to be present.

16. The apparatus of claim 12, wherein the apparatus is further configured to:
    apply a gaussian mixture model (GMM) on the aggregated system data.

17. The apparatus of claim 12, wherein the apparatus is further configured to:
   perform a linear regression between the baseload current and corresponding time-stamps.

18. The apparatus of claim 17, wherein the apparatus is further configured to:
   determine if a trend of the linear regression is above a predetermined threshold.

19. The apparatus of claim 18, wherein the apparatus is further configured to:
   determine the air leak when a p-value of the linear regression trend is above a predetermined threshold.

20. The apparatus of claim 12, wherein the apparatus is further configured to:
   segment air pipes of the compressed air system into at least two segments if an air leak is determined to be present;
   collect current measurement samples for each segment over a predetermined period of time; and
   determine, if the air leak is present, which segment contains the air leak.

21. The apparatus of claim 20, wherein the apparatus is further configured to:
   provide a notification of which segment contains the air leak.

* * * * *